United States Patent
Ludewig et al.

(10) Patent No.: US 7,128,431 B2
(45) Date of Patent: Oct. 31, 2006

(54) DISPLAY DEVICE

(75) Inventors: Bernd Ludewig, Hirschberg (DE); Ralf Mayer, Bolanden (DE); Heinrich Noll, Gross-Umstadt (DE)

(73) Assignee: Siemens Aktiengesellschaft, München (DE)

( * ) Notice: Subject to any disclaimer, the term of this patent is extended or adjusted under 35 U.S.C. 154(b) by 35 days.

(21) Appl. No.: 10/492,071

(22) PCT Filed: Oct. 1, 2002

(86) PCT No.: PCT/DE02/03721

§ 371 (c)(1),
(2), (4) Date: Apr. 8, 2004

(87) PCT Pub. No.: WO03/034125

PCT Pub. Date: Apr. 24, 2003

(65) Prior Publication Data

US 2004/0262053 A1    Dec. 30, 2004

(30) Foreign Application Priority Data

Oct. 10, 2001  (DE)  ............................... 101 49 836
Oct. 10, 2001  (DE)  ............................... 101 49 837

(51) Int. Cl.
*G01D 11/28*    (2006.01)

(52) U.S. Cl. ....................... 362/26; 362/555; 362/800; 385/33; 385/116

(58) Field of Classification Search .................. 362/26, 362/616, 612, 606, 555, 583, 554, 556, 621; 385/116, 33–35
See application file for complete search history.

(56) References Cited

U.S. PATENT DOCUMENTS

| | | | |
|---|---|---|---|
| 4,331,380 A | 5/1982 | Rees et al. | |
| 4,544,259 A | 10/1985 | Kanaoka | |
| 4,932,747 A * | 6/1990 | Russell et al. | ............... 385/115 |
| 4,945,230 A * | 7/1990 | Saaski et al. | ........... 250/227.21 |
| 5,031,078 A * | 7/1991 | Bornhorst | ................... 362/552 |
| 5,657,163 A | 8/1997 | Wu et al. | |
| 6,402,347 B1 * | 6/2002 | Maas et al. | .................. 362/294 |
| 6,527,411 B1 * | 3/2003 | Sayers | ........................ 362/245 |
| 6,543,925 B1 * | 4/2003 | Kuykendal et al. | .......... 362/554 |
| 2005/0169323 A1 * | 8/2005 | Spariosu | ........................ 372/9 |

FOREIGN PATENT DOCUMENTS

| | | |
|---|---|---|
| DE | 3425761 A1 | 2/1985 |
| EP | 0 271 956 | 6/1988 |
| WO | WO 95/20811 | 8/1995 |

* cited by examiner

*Primary Examiner*—Renee Leubke
*Assistant Examiner*—Gunyoung T. Lee
(74) *Attorney, Agent, or Firm*—Cohen, Pontani, Lieberman & Pavane (57) ABSTRACT

The invention relates to a display device, especially in a motor vehicle, comprising a display (2) which can be illuminated by a light source (1), and a light guide (7) which is arranged between the light source (1) and the display (2). Said light source (1) comprises a plurality of individual light sources (10), the entire light-radiating surface of said light sources being larger than the surface of the display (2). In order to increase the light efficiency, the light guide (7) comprises, on the light source side, individual light guiding sections (12) which are associated with the individual light sources (10), said sections forming a common light guiding section (13) on the display side.

14 Claims, 9 Drawing Sheets

DISPLAY DEVICE

PRIORITY CLAIM

This is a U.S. national stage of application No. PCT/DE02/03721, filed on Oct. 1, 2002. Priority is claimed on that application and on the following application: Country: Germany, Application No.: 101 49 836.5, Filed: Oct. 10, 2001.

BACKGROUND OF THE INVENTION

1. Field of the Invention

The invention relates to a display device, in particular in a motor vehicle, having a display that can be illuminated by a light source, and a light guide arranged between the light source and display, the light source having several individual light sources whose overall light-emitting surface is larger than the surface of the display.

2. Description of the Prior Art

Such display devices are known, and are used, for example in motor vehicles for instrument illumination. By contrast with displays that can be illuminated by intense individual light sources such as, for example, halogen lamps or fluorescent lamps, these devices can have a lower power consumption and reduced heat loss emission.

For reasons of traffic safety, there is an urgent need in motor vehicles for the individual display instruments to have a brightness that enables them to be read even given high ambient brightness. This is also of great importance, in particular, for so-called headup displays where—as described in DE 198 52 842 C1, for example—an image is reflected into a front pane of the motor vehicle. Because of the constricted space conditions generally applying in the region of the dashboard of the motor vehicle in which the display device is fitted, and of the therefore problematic use of intense light sources that, firstly, require a large installation space and, secondly, emit a substantial heat loss, an attempt is being made to replace the individual light source by a plurality of light sources that admittedly each have a low light intensity per se, but which also have a low heat loss emission. The problem arises in this case that because of geometric boundary conditions—the miniaturization of these light sources is limited—the arrangement of light sources requires a larger surface than that to be illuminated.

A known solution to this problem consists in arranging between the light sources and display a light guide in the form of a solid pyramidal frustum whose base surface adjoins the light sources and which tapers in the direction of the display. Owing to this shape of the light guide, the light beams emerge from the light guide at a larger angle than that at which they entered it. This opposes the requirement for a narrow light emission angle that ensures a high intensity of illumination. Again, there are disadvantageous light losses owing to the exit of light at the side surfaces of the light guide, since the light beams impinge on the surface on each reflection at a relatively large angle near the perpendicular, and the total reflection is thereby cancelled.

SUMMARY OF THE INVENTION

It is therefore the object of the invention to configure a display device of the type mentioned at the beginning such that the light emitted by the individual light sources is available for illuminating the display in a way as free as possible from losses.

This object is achieved according to the invention by virtue of the fact that either the light guide has individual light guiding sections that are assigned to the individual light sources on the light source side and which merge on the display side into a common light guiding section, or in that the light guide has convex lens elements on its light entrance side facing the light source and on its light exit side facing the display, the individual light sources respectively being assigned a convex lens element, corresponding to a convex lens element on the light exit side, on the light entrance side. Light losses can therefore be avoided as far as possible in a simple way. In the case of the second solution, the light is guided between the convex lens elements on the light entrance side and those on the light exit side of the light guide the light is in a fashion focussed by the first-mentioned lens elements and avoiding scattering losses. The display device according to the invention also has a very low space requirement and permits the use of any desired light sources. The power efficiency of the device is very high, and there is no need for an additional cooling device even in the case of a restricted installation in the dashboard of a motor vehicle.

A further increase in the light efficiency is achieved by an embodiment of the display device according to the invention, in which the emission angle of the light emerging from the light guide is exactly equal to or less than the emission angle of the light radiated by the light source. In this way, the light is not only led with low losses in the light guide from the light source to the display, but is focussed in addition at the same time in a fashion that increases intensity.

Any desired arrangement of the individual light sources is conceivable owing to the possibility of freely configuring and arranging the individual light guiding sections. Particularly in the case of approximately rectangular displays, however, it is of particular advantage when the individual light sources are arranged in matrix form. This gives rise to particularly short light guiding paths which are, in addition, largely free of light losses, since the light paths have no additional deflections or diversions.

The individual light sources may comprise LEDs, and this is attended by an increased service life of the illumination unit and by an only slight incidence of heat loss.

The display device according to the invention can be produced particularly easily and also in very large numbers such as occur for motor vehicle applications, in particular, when the individual light sources are preferably arranged on a printed circuit board and make electric contact with the latter. In addition, individual electric connections to be fitted expensively are thereby rendered superfluous. It is particularly advantageous in this case when the printed circuit board has a high thermal conductivity such that the risk of overheating of the light sources can be excluded even given high ambient temperatures.

Particularly in the case of a very restricted installation of the display device according to the invention in an environment that is warm, in addition, the light source may include a cooling element for dissipating heat from the individual light sources.

In accordance with a further embodiment of the invention, the light source has convex lenses on its light exit side facing the light guide, a convex lens corresponding in each case on the one hand to an individual light source and on the other hand to an individual light guiding section. Focussing of the light, and thus an even further-reaching optimization of the light efficiency is thereby achieved.

In this case, both the production, for example using an injection-molding method, and the mounting of the convex lenses are particularly simple, when the convex lenses are advantageously connected to one another in a fashion forming a single convex lens component. A further simplification and reduction in the number of components is possible if a convex lens is connected to an individual light source in a fashion forming a single component. This can be achieved, for example, by virtue of the fact that the convex lenses are molded onto the individual light sources in each case using an injection-molding method, or that they are mounted in another way, for example by being cast with epoxy resin.

Arbitrarily transilluminable images could be envisaged as the display. However, it is particularly advantageous when the display has a transilluminable LCD, particularly for a variable representation of information in a compact display device that can also be produced in large numbers cost-effectively and has a long storage life.

A particularly lightweight, cost-effective light guide of high efficiency is achieved when the light guide consists of a transparent, light-guiding plastic. PMMA (polymethyl methacrylate) has proved to be a material outstandingly suited to this purpose. With this material, the light guide has very good optical properties.

Light is guided with particularly low losses in the case of the first solution when the individual light guiding sections are designed as fingers with an approximately constant cross-sectional area.

Moreover, the light efficiency can be further improved when the individual light guiding sections have a convex lens on their light entrance side facing the light source.

On the light exit side of the light guide, the focussing of the light, and thus also the light efficiency are advantageously additionally improved when the light guide is convex overall at its light exit side facing the display. Instead of the one convex shape, the light guide can advantageously have convex lens elements on its light exit side facing the display, the convex lens elements respectively being assigned to a light guiding section. A particularly good tuning of the light guiding sections and convex lens elements can thereby be achieved.

The light guide may include directional and/or deflecting elements with the aid of which the light is guided from the entrance side of the light guide to its exit side. A particularly lightweight light guide for which only a small amount of material is required in conjunction with very low loss light guidance prevails advantageously, by contrast, when a first central connecting straight line, between a first convex lens element on the light exit side and a first convex lens element, corresponding thereto, on the light entrance side, and a second central connecting straight line, between a second convex lens element on the light exit side and a second convex lens element, corresponding thereto, on the light entrance side of the light guide are arranged at an angle to one another.

In this case, the outlay on material for the light guide can be further reduced, and accumulations of material that can lead to inhomogeneities are avoided when, in accordance with an advantageous development of the invention, a region of space, arranged between the first and second connecting straight lines, of the light guide is cleared of material in a fashion forming an interspace.

The display device can basically have any desired displays. However, in accordance with an emobodiment of the invention, the display device comprises a headup display in a motor vehicle, since the advantages of high light efficiency, small installation space and low heat emission thereby especially come to bear.

BRIEF DESCRIPTION OF THE DRAWINGS

The invention is explained in more detail below with the aid of exemplary embodiments illustrated in the attached drawing in which.

DETAILED DESCRIPTION OF THE PRESENTLY PREFERRED EMBODIMENTS

Respectively corresponding elements are provided with identical reference numerals in the figures.

Figure 1:
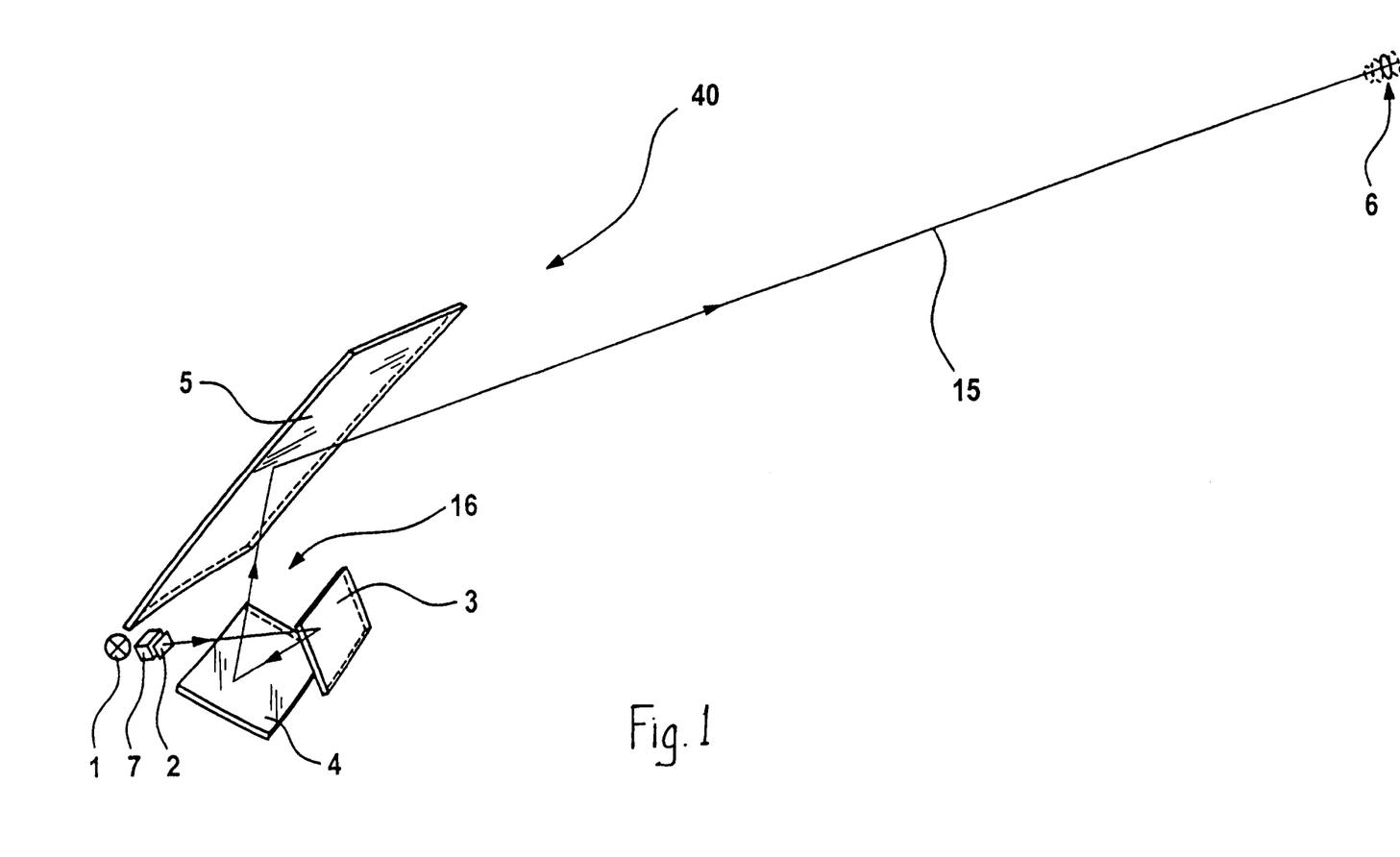
FIG. 1 is a schematic view of the principle components of a headup display in a display device in a motor vehicle.

A headup display 16 is shown in FIG. 1 in a schematic display device 40 of a motor vehicle (not illustrated here in more detail). An image produced with the aid of a display 2 that can be illuminated by a light source 1 with the aid of a light guide 7, is reflected, following the beam path 15 depicted, at a deflecting mirror 3 and led via a concave mirror 4 to a windshield 5 from where the image is passed on as a virtual image into an eye, marked by an eye position 6, of a viewer (not further illustrated), for example the motor vehicle driver.

Figure 2A:
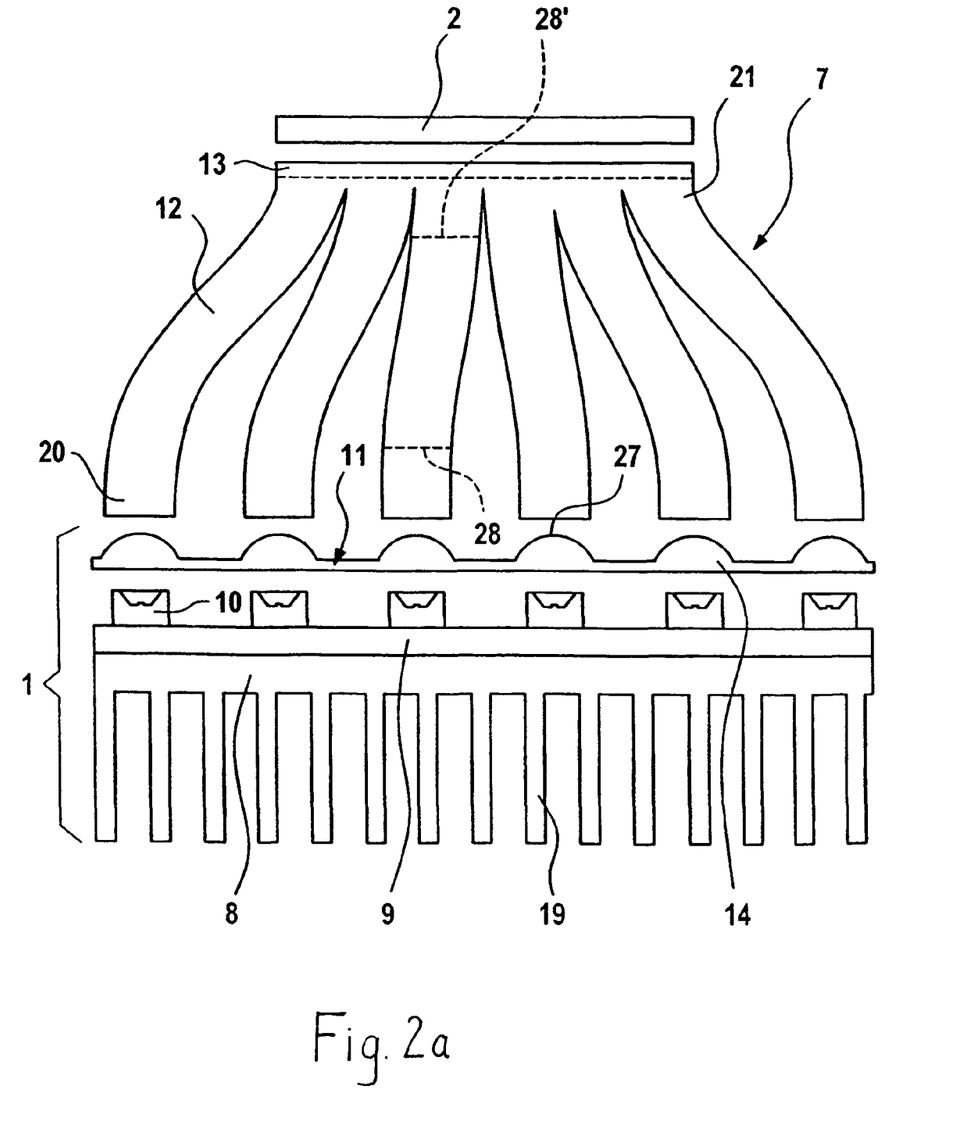
FIG. 2a is a sectional side view showing a detail of the display device of FIG. 1.

The particulars of a detail of a display device in a first embodiment are shown in FIG. 2a. It is to be seen here that a display 2 formed by an LCD can be illuminated by a light source 1 via an injection-molded light guide 7 made from transparent, light-guiding plastic. The light source 1 has a printed circuit board 9 on the front side of which, facing the light guide 7, a number of individual light sources 10 are arranged and fastened and make electric contact. The individual light sources 10 are formed by LEDs, and the overall light-emitting surface of the individual light sources 10 is greater than the surface of the display 2. On its rear side, the printed circuit board 9 is provided with a cooling element 8, having cooling ribs 19, for dissipating the heat produced by the light sources 10.

The light guide 7 has individual light guiding sections 12 constructed as fingers with cross-sectional areas 28, 28'. The cross sectional areas 28, 28' of each of the individual light guiding sections 12 are approximately constant in the course of the individual light guide section 12. Each one of the individual light sources 10 is assigned to a beginning 20 of an individual light guiding section 12. Moreover, for the purpose of focussing the light emitted in each case by the individual light sources 10, the light source 1 is provided with a convex lens component 11 that has a plurality of convex lenses 14 that are connected to one another in a fashion forming a single component. The arrangement is selected in such a way that in each case a convex lens 14 is arranged upstream of an individual light source 10 such that the light radiated by in each case one individual light source 10 is focussed in a defined and targeted fashion by an assigned convex lens 14 in each case. It is also to be seen that the individual light guiding sections 12 merge into a common light guiding section 13 at their end 21 facing the display. As a result of this, the light of the individual light sources 10 is mixed, with the result that a uniformly, evenly illuminated surface is produced on the side of the light guide 7 where the light is coupled out.

Figure 2B:
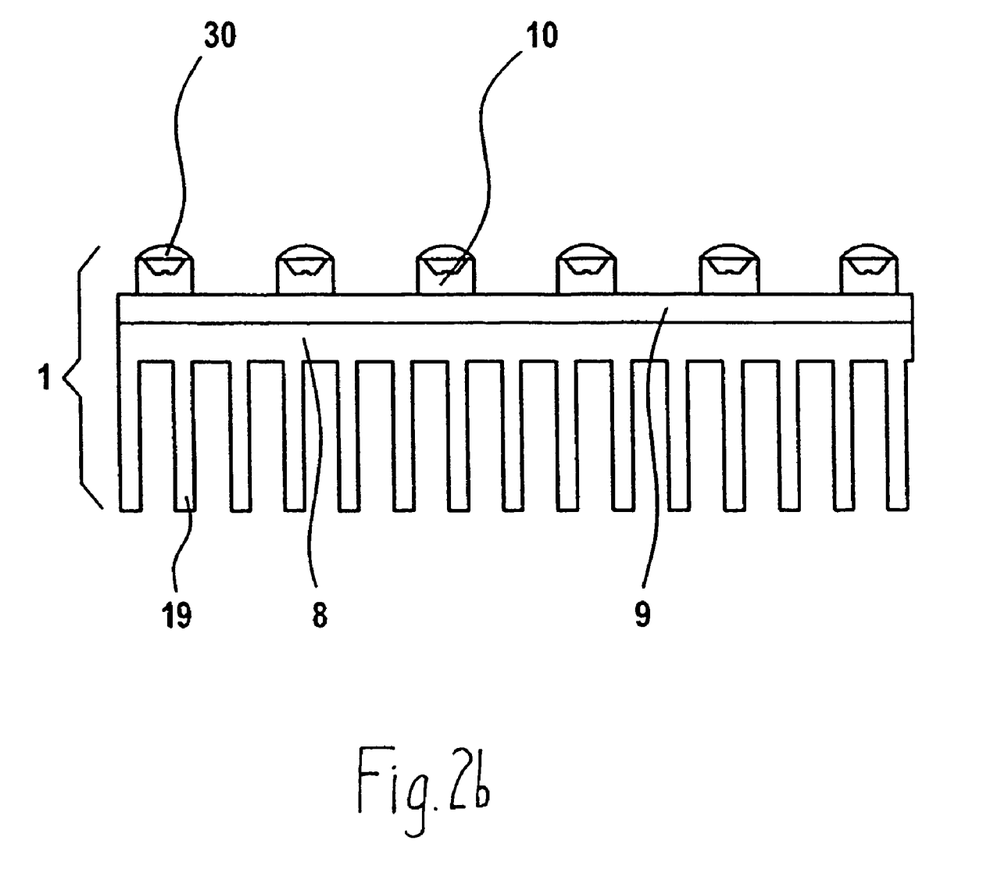
FIG. 2b is a sectional side view of an alternative light source of a display device according to FIG. 2a, FIG. 3 is a perspective sectional side view of an alternative light source of a display device according to FIG. 2a, FIG. 4 is perspective view of a light guide of another display device.

An alternative light source 1 with a cooling element 8 having cooling ribs 19 is shown in FIG. 2*b*. With this light source 1, as well, individual light sources 10 constructed as LEDs are arranged on a printed circuit board 9 and brought into electric contact with the latter. By contrast with the light source according to FIG. 2*a*, the light source 1 according to FIG. 2*b* does not, however, have a convex lens component with a plurality of convex lenses, but in each case a convex lens 30 is connected to an individual light source 10 in a fashion forming a single component. For this purpose, the convex lenses 30 consist of plastic and are, for example, molded in each case onto one of the individual light sources 10 using an injection-molding method.

Figure 3:
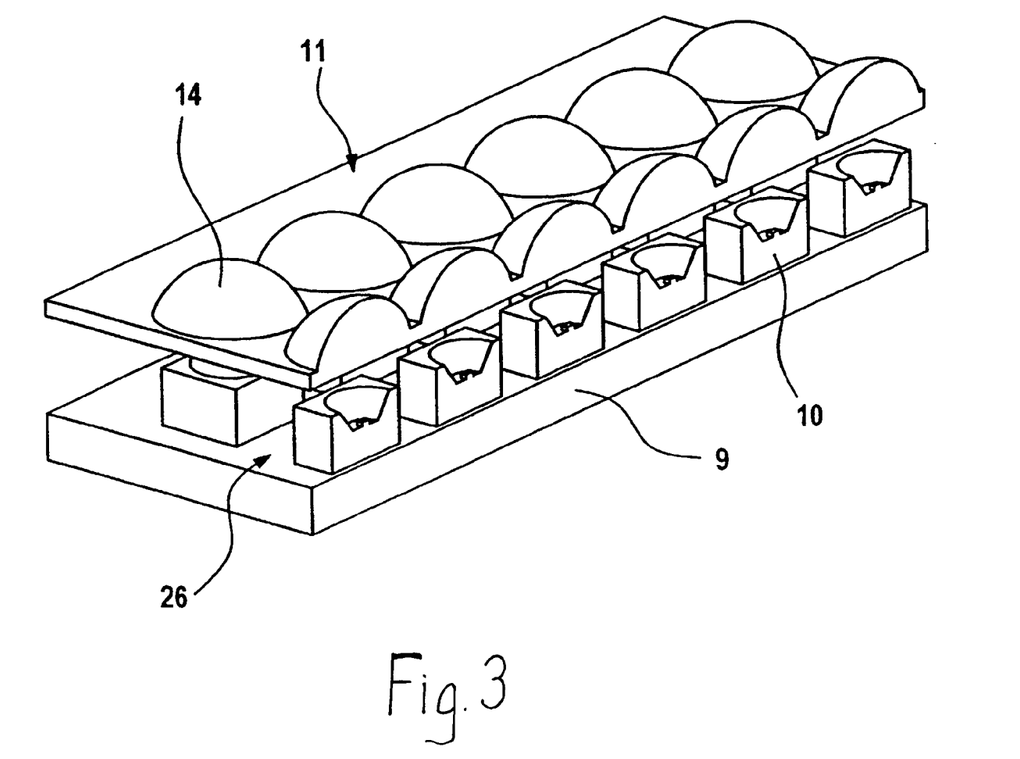

In order to explain the spatial design of the light source, FIG. 3 illustrates in a sectioned perspective view the printed circuit board 9 with individual light sources 10 arranged thereon, and with the assigned convex lens component 11 having the convex lenses 14. The individual light sources 10 formed by LEDs are arranged in matrix form 26, and they are assigned in each case a convex lens 14 of the convex lens component 11.

Figure 4:
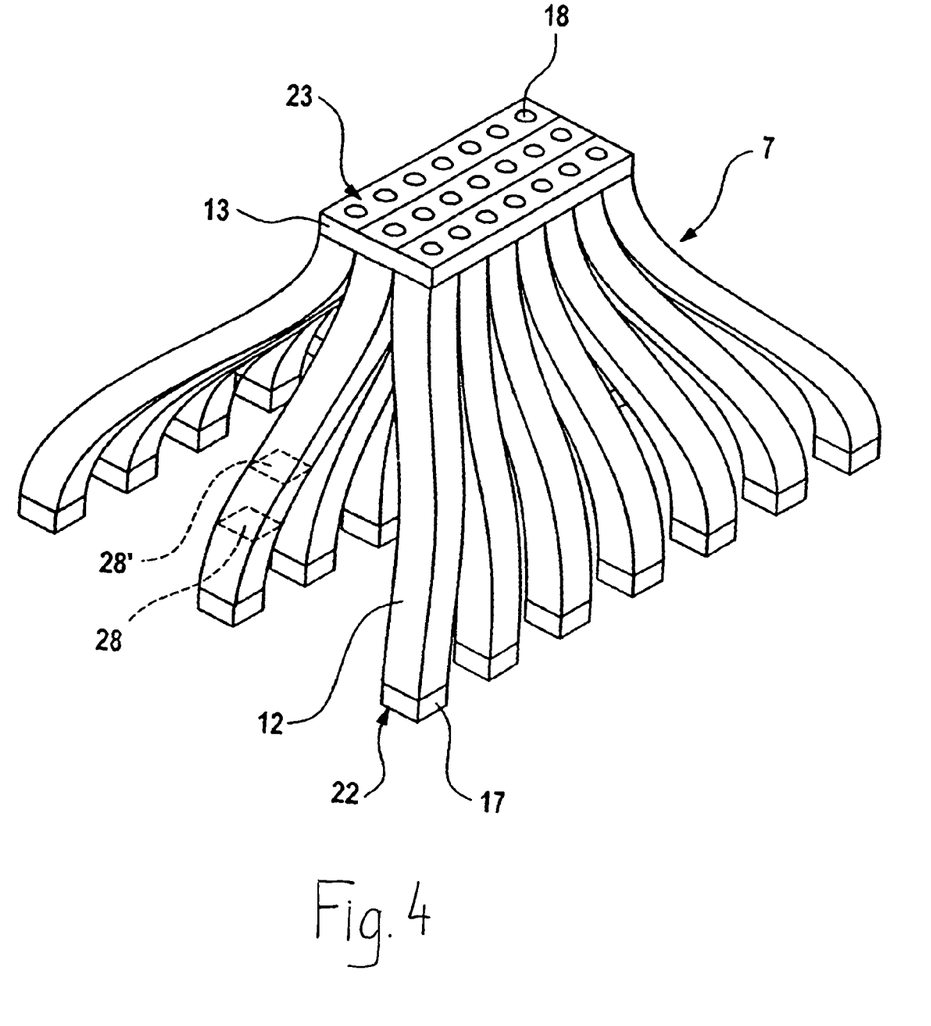

FIG. 4 shows a further light guide 7. It is to be seen here, too, that individual light guiding sections 12 are constructed as fingers with a cross-sectional areas 28, 28' that remains approximately constant in their course. Moreover, in this embodiment the individual light guiding sections 12 in each case have a convex lens 17—illustrated in a stylized fashion—on their light entrance side 22 facing the light source (not illustrated here). Moreover, the light guide 7 has on its light exit side 23 facing the display—likewise not illustrated here—convex lens elements 18 that are respectively assigned to an individual light guiding section 12 and are located on a common light guiding section 13.

Figure 5:
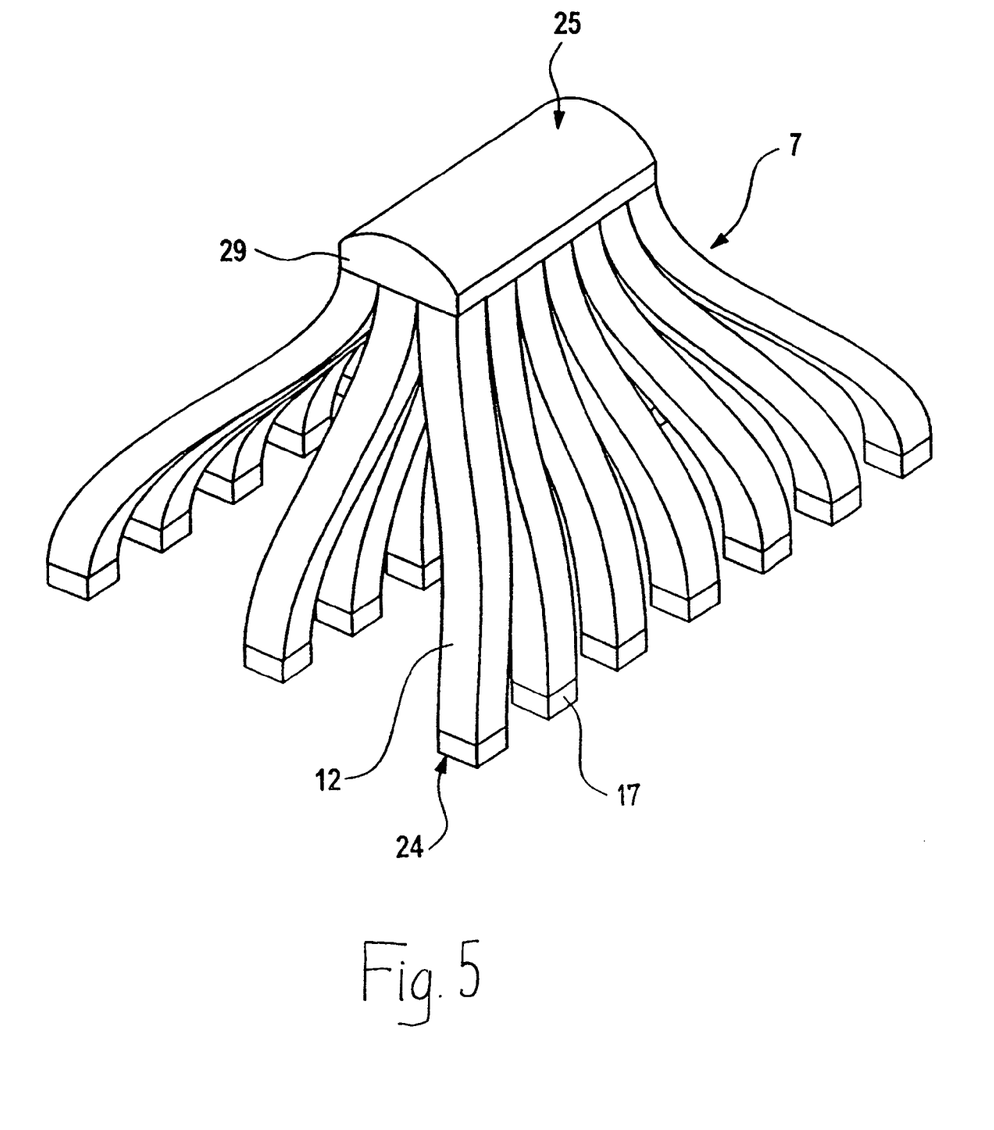
FIG. 5 is perspective view of a light guide of a further display device.

The embodiment according to FIG. 5 differs from that according to FIG. 4 in that rather than individual convex lens elements being arranged on the light exit side 25, facing the display, of a light guide 7, the light guide 7 itself is convex overall, specifically in a common light guiding section 29 that combines individual light guiding sections 12. The light exit side 25, arranged on the common light guiding section 29, of the light guide 7 is consequently curved like a barrel. The individual light guiding sections 12 of the light guide 7 are provided at their light entrance side 24 with convex lens elements 17—illustrated in a stylized fashion.

Figure 6A:
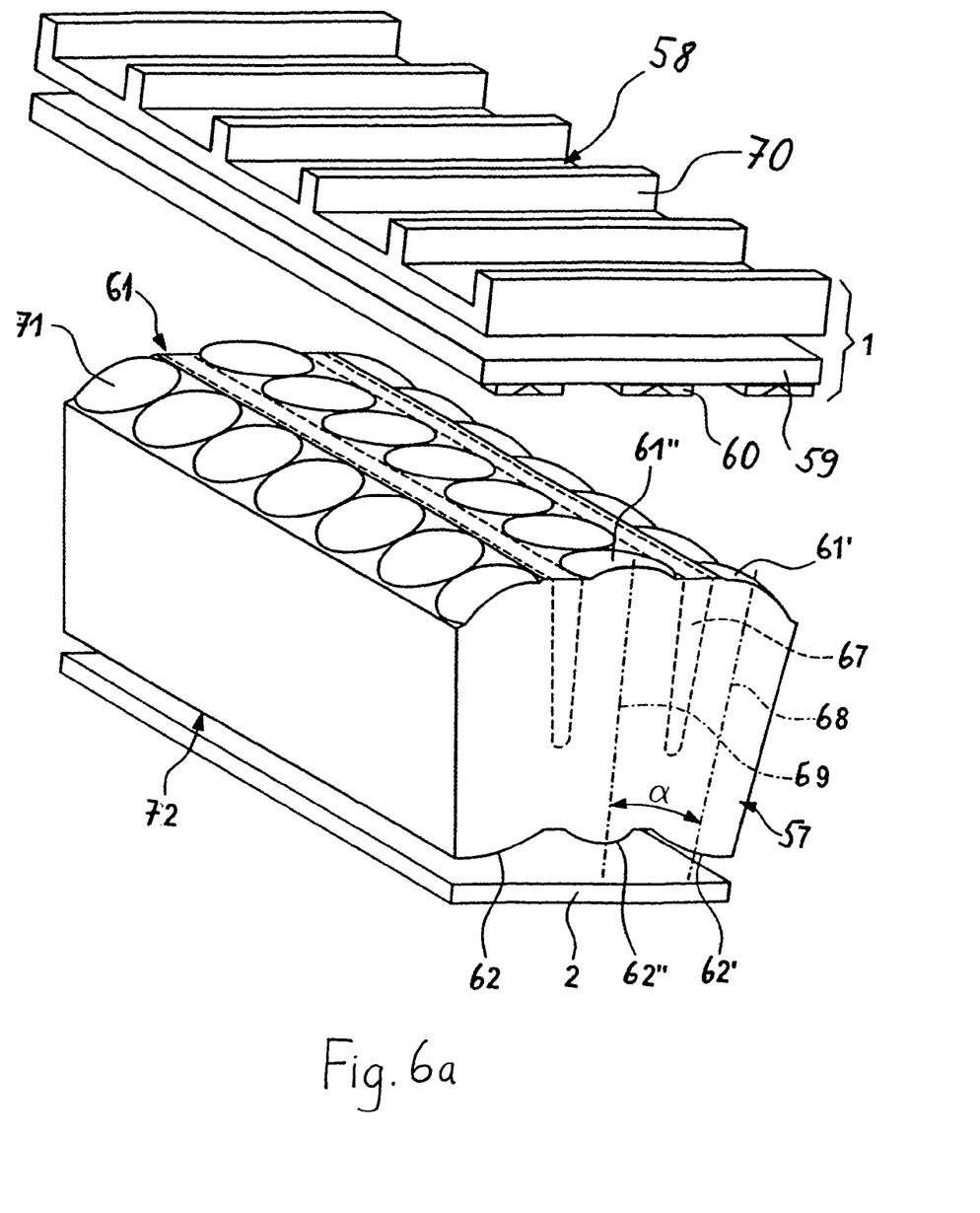
FIG. 6a is sectional perspective view showing a detail of a display device in a sectional side view in a second embodiment.

Particulars of a detail of a display device in the second embodiment are shown in FIG. 6*a*. Here, a display 2 formed by a transilluminable LCD can be illuminated by a light source 1 via a light guide 57 made from transparent, light-guiding plastic. The light source 1 has a printed circuit board 59 on the front side of which, facing the light guide 57, a number of individual light sources 60 are arranged and fastened and make electric contact. The individual light sources 60 are formed by LEDs, and the overall light-emitting surface of the individual light sources 60 is greater than the surface of the display 2. On its rear side, the printed circuit board 59 is provided with a cooling element 58, having cooling ribs 70, for dissipating the heat produced by the light sources 60. Moreover, the printed circuit board 59 itself has a high thermal conductivity, and thus contributes to the dissipation of heat.

The light guide 57 has convex lens elements 61 on its light entrance side 71 facing the light source 1, in each case one of the convex lens elements 61 corresponding to one of the individual light sources 60. Each individual light source 60 radiates light essentially into in each case one convex lens element 61 that focuses the light emitted by the individual light source 60.

In each case a convex lens 61 is arranged upstream of an individual light source 60 such that the light radiated by in each case one individual light source 60 is focussed in a defined and targeted fashion by in each case one assigned convex lens 61. Further convex lens elements 62 are arranged on the light exit side 72, facing the display 2, of the light guide 57. In each case one of the convex lens elements 61 on the light entrance side 71 of the light guide 57 is assigned a convex lens element 62 on the light exit side 72 of the light guide 57.

The basic shape of the light guide 57 is approximately that of a wedge, this being seen in the fact that a first connecting straight line 68, which runs through a first convex lens element 62' on the light exit side 72 and through a first convex lens element 61', corresponding thereto, on the light entrance side 71, and a second connecting straight line 69, which runs through a second convex lens element 62" on the light exit side 72 and through a second convex lens element 61" corresponding thereto, on the light entrance side 71, are arranged at an acute angle α to one another. Both the first connecting straight line 88 and the second connecting straight line 69 are arranged centrally in relation to the convex lens elements 61', 62', 61", 62" intersected by them.

Furthermore, a region of space 67, arranged between the first connecting straight line 68 and the second connecting straight line 69, of the light guide 57 is cleared of material in a fashion forming an interspace. The region of space 67 contributes essentially nothing to the guiding of the light from the light source 1 to the display 2; the fact that it is freed from material firstly reduces the weight of the light guide 57, and secondly avoids accumulation of material possibly leading to inhomogeneities.

Figure 6B:
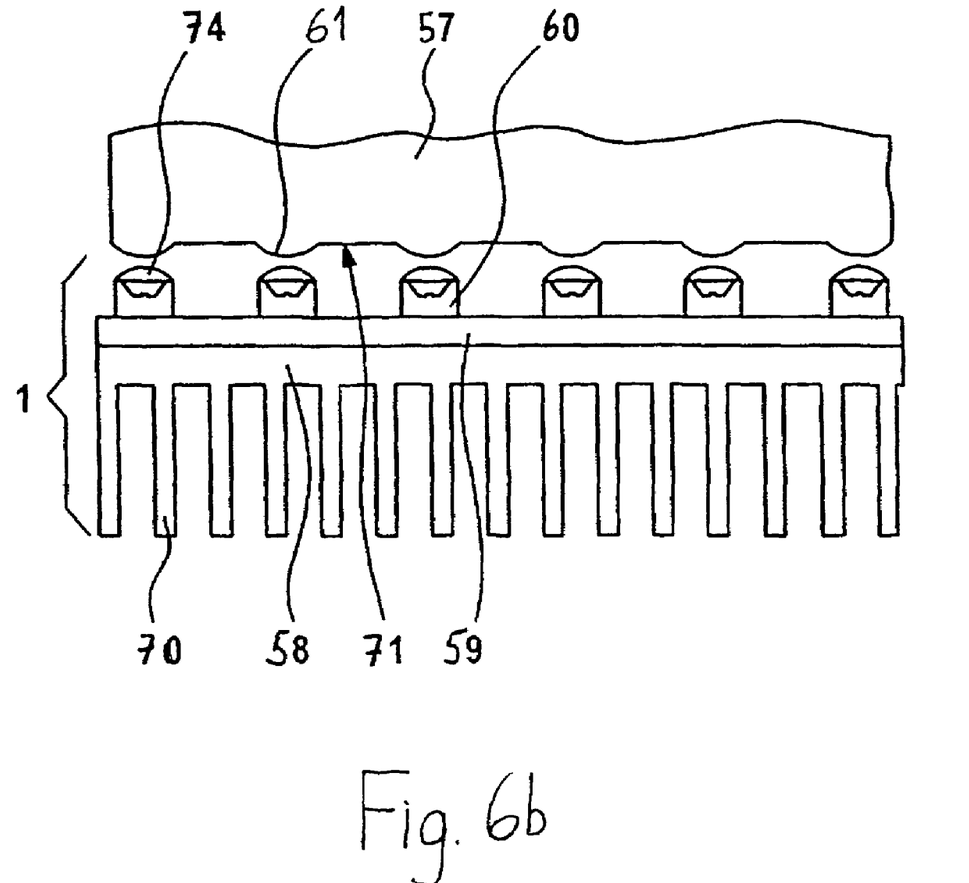
FIG. 6b is a section side view an alternative light source of the display device according to FIG. 6a, and FIG. 7 is a perspective sectional view of a detail of a further light source.

FIG. 6*b* shows an alternative light source 1 with a cooling element 58 having cooling ribs 70, and a detail of a light guide 57. In the case of this light source 1, as well, individual light sources 60 designed as LEDs are arranged on a printed circuit board 59 and brought into electric contact therewith. By contrast with the light source according to FIG. 6*a*, the individual light sources 60 of the light source 1 according to FIG. 6*b* in each case have a convex lens 74, each individual light source 60 being connected to the convex lens 74 assigned to it in a fashion forming a single component. For this purpose, the convex lenses 74 are made from plastic and are molded onto the individual light sources 60 in each case using an injection-molding method. The convex lenses 74 serve in each case to focus the light radiated by an individual light source 60 in a defined and targeted fashion. Furthermore, in each case a convex lens 74 corresponds to a convex lens element 61 on the light entrance side 71 of the light guide 57, the convex lenses 74 and the convex lens elements 61 being arranged opposite one another in each case.

Figure 7:
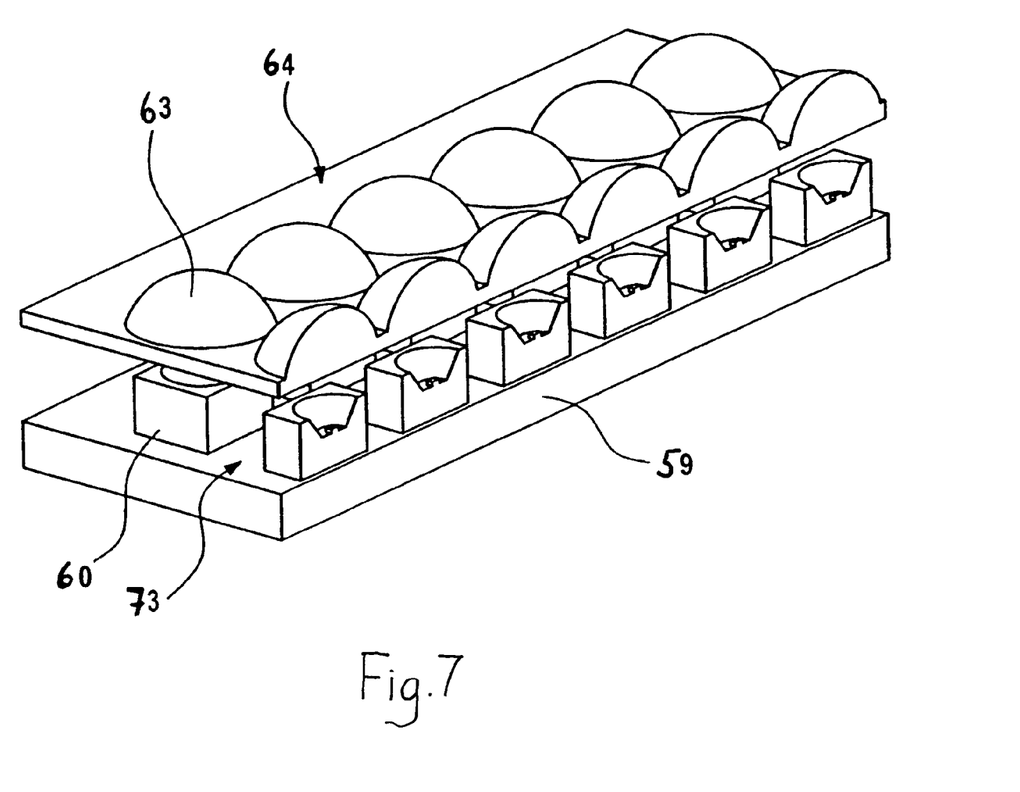

In order to explain the spatial design of a further light source, FIG. 7 illustrates in a sectioned perspective view the printed circuit board 59 with individual light sources 60 arranged thereon, and with an assigned convex lens component 64 having convex lenses 63. The individual light sources 60 formed by LEDs are arranged in matrix form 73, and they are assigned in each case a convex lens 63 of the convex lens component 64. The arrangement is selected here in such a way that in each case a convex lens 63 is arranged upstream of an individual light source 60 such that the light radiated by in each case one individual light source 60 is focussed in a defined and targeted fashion by in each case one assigned convex lens 63.

What is claimed is:

1. A display device for a motor vehicle, comprising:
   a display having a display surface;
   a light source having a plurality of individual light source elements for illuminating said display, said light source having an overall light-emitting surface that is larger than said display surface of said display; and
   a light guide arranged between said light source and said display and having a light source side facing said light source and a display side facing said display, said light guide having convex lens elements on said light source side and said display side, wherein each of said plural light source elements is assigned to one of said convex lens elements on said light source side and a respective corresponding convex lens element on said display side.

2. The display device of claim 1, wherein an emission angle of the light emerging from the light guide is equal to or less than an emission angle of the light radiated by said light source.

3. The display device of claim 1, wherein said individual light source elements are arranged in a matrix.

4. The display device of claim 1, wherein said individual light source elements comprise LEDs.

5. The display device of claim 1, wherein said light source comprises a printed circuit board, said individual light source elements being arranged on said printed circuit board for making electrical contact with said printed circuit board.

6. The display device of claim 5, wherein said printed circuit board has a high thermal conductivity.

7. The display device of claim 1, wherein said light source comprises a cooling element for dissipating heat from said individual light source elements.

8. The display device of claim 1, wherein said display comprises a transilluminable LCD.

9. The display device of claim 1, wherein said light guide is made of a transparent, light guiding plastic.

10. The display device of claim 9, wherein said plastic is polymethyl methacrylate (PMMA).

11. The display device of claim 1, wherein a first central connecting straight line between a first one of said convex lens elements at said display side and a corresponding first one of said convex lens elements at said light source side, and a second central connecting straight line between a second one of said convex lens elements on said display side and a corresponding second one of said convex lens elements on said light source side of said light guide are arranged at an acute angle ($\alpha$) to one another.

12. The display device of claim 11, a space arranged between said first and second connecting straight lines of said light guide is cleared of material thereby forming interspace.

13. The display device of claim 1, wherein said display device comprises a headup display in a motor vehicle.

14. A display device for a motor vehicle, comprising:
   a display having a display surface;
   a light source having a plurality of individual light source elements for illuminating said display, said light source having an overall light-emitting surface that is larger than said display surface of said display; and
   a light guide arranged between said light source and said display and having a light source side facing said light source and a display side facing said display, said light guide having individual light guiding sections on said light source side and convex lens elements on said display side, said convex lens elements respectively being assigned to said individual light guiding sections.

* * * * *